May 23, 1967  A. LÖBBE  3,321,249
COAL PLANER HAVING ADJUSTABLE AND RELATIVELY ADJUSTABLE CUTTERS
Filed May 7, 1965
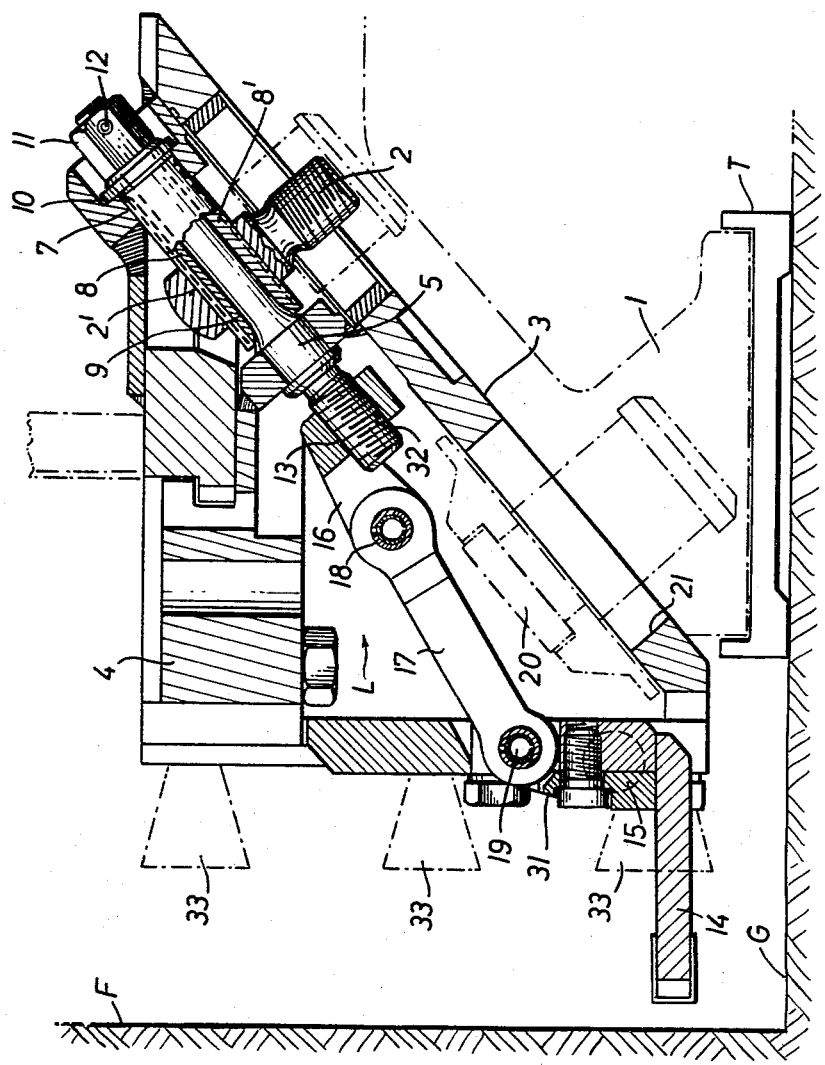
INVENTOR:
Armin Löbbe
BY Burgess, Dinklage & Sprung
ATTORNEYS

United States Patent Office 3,321,249
Patented May 23, 1967

3,321,249
COAL PLANER HAVING ADJUSTABLE AND
RELATIVELY ADJUSTABLE CUTTERS
Armin Löbbe, Oberaden, Germany, assignor to Gewerkschaft Eisenhütte Westfalia, Wethmar, near Lunen, Westphalia, Germany, a corporation
Filed May 7, 1965, Ser. No. 453,903
10 Claims. (Cl. 299—34)

This invention relates to mineral planing equipment in general, and more particularly to a coal planer arrangement which provides means for selectively positioning a first cutter bearing element and a second cutter bearing element relative to a carriage means and relative to each other in order to achieve an advantageous operative engagement of the cutters on said elements with a mine face.

In the coal planer arrangement of the invention, the first and second cutter bearing elements are supported by a carriage means having a guide surface and which is disposed for movement along a predetermined path situated normally parallel and in front of the mine face, such as, for example, a carriage means which is driven along a guide track supported by the mine floor, said guide track being disposed parallel to the mine face and at such distance in front of the mine face as permits the planing cutters carried by the first and second cutter bearing elements to operatively engage said mine face to remove coal therefrom along a longitudinal path corresponding in extension to the displacement of the carriage means along said guide track.

In accordance with the invention, the guide surface on the carriage means is preferably inclined at an acute angle relative to the predetermined path of movement thereof, and hence, in an ordinary mining seam wherein the mine face is disposed approximately perpendicular to the mine floor, the carriage means guide surface will also be inclined at an acute angle relative to the mine face. This particular feature permits both adjustment in the cutting depth and cutting height of the cutters on the first and second cutter bearing elements which are movable in relation to the guide surface on the carriage means.

Such adjustment is accomplished in the coal planer arrangement of the instant invention by disposing the first cutter bearing element, which carries the main planing cutters for movement relative to the carriage means in a first path along the guide surface and parallel thereto, and by pivotally connecting the second cutter bearing element which carries one or more scoring cutters, to said first cutter bearing element. Thus, the first and second cutter bearing elements are movable together along said first path, and the second cutter bearing element can be moved relative to the first cutter bearing element in a second path by rotating said second cutter bearing element about its pivot connection axis. In effect, the first cutter bearing element is provided with a translation capability along the inclined guide surface of the carriage means to permit the height and/or depth of its main cutters to be selectively adjusted, whereas the second cutter bearing element is provided with a combined translation capability established by the movement of the first cutter bearing element, and an additional swing movement capability by reason of the pivotal connection of said second cutter bearing element to the first cutter bearing element.

Accordingly, by controlling the angular position of said second cutter bearing element about its pivot axis, the cutting height and/or depth of the scoring cutters carried thereby can be selectively adjusted for an advantageous cutting engagement with the mine face.

For moving the first cutter bearing element relative to the carriage guide surface, means are provided in the form of a pin member which is pivotally connected to the carriage, and a threaded rotatable sleeve member in operative engagement with a threaded hole extending through said pin member, said sleeve member being operatively connected to the first cutter bearing element and rotatable about an axis parallel to the carriage guide surface. The first cutter bearing element is moved in a radial path relative to the pivot connection axis of the pin member in response to the rotation of the sleeve member, said radial path being also parallel to the carriage guide surface.

A second means operatively connected to the first cutter bearing element and to the second cutter bearing element is provided for moving said second cutter bearing element relative to the first cutter bearing element upon a second path, which corresponds to the swing path of said second cutter bearing element when it is rotated about its pivot connection axis.

This second movement means can be expediently provided in accordance with the invention in the form of a screw member disposed through the sleeve member for rotation about an axis coaxial with the axis of rotation of said sleeve member, said screw member being constrained against axial motion relative to said first cutter bearing element, and linkage means operatively connected to said second cutter bearing element and in operative engagement with said screw member to rotate said second cutter bearing element relative to the first cutter bearing element about the pivot connection axis of said second cutter bearing element in response to the rotation of said screw member.

Thus, the invention provides a coal planer arrangement having main cutters and having scoring cutters running in the lead, and a carriage which has a guide surface slanting downward toward the coal face and equipped with a pivot pin, upon which the main cutter bearing element rests, said main cutter bearing element being pivotable about the pivot axis of the pivot pin and displaceable both perpendiculary and parallelly to the coal face.

It is common in such plane-like coal winning apparatus to design them in two parts, so that the upper part or element bearing the main cutters can be pivoted slightly in relation to the carriage means whenever the direction of movement of the planer carriage is reversed. This is done in order to lift the rear plane cutters out of contact with the coal face and to prevent them from dragging thereon.

A plane-like coal winning apparatus without scoring cutters running in the lead has already been proposed, in which the upper main cutter bearing element can be pivoted about a pivot pin and can be displaced perpendicularly to the coal face and to the mine floor. This additional capability of displacement of the main cutter bearing element on a guide surface of the planer carriage that slants downward toward the coal face has the advantageous effect that the height of the points at which the individual main chisel cutters attack the coal face can be varied. Even in coal seams which are well suited for coal winning by planing methods, conformably bedded strata of rock often no thicker than the size of a human finger are frequently found in the coal, and which greatly interfere with the planing operation, especially when this rock stratum, also known as a rock band, is located precisely opposite a cutter.

In such cases it is sufficient to change slightly the height of the points of attack of the main cutters, so that the interfering rock band is straddled by two adjacent cutters and does not have to be directly cut by them.

In the case of one prior art coal planer arrangement, a ring is provided for adjustment of the height of the main cutters. This ring has an eccentric opening for receiving the pivot pin about which the main cutter bearing element performs the slight pivoting movement first mentioned. Although, by turning this ring, the pivot point can be displaced upward or downward in reference to the main cutter bearing element, there is no provision for either the upward or downward displacement of any scoring cutters in this apparatus.

The coal planer arrangement of the instant invention is designed to eliminate this deficiency, and to provide means for varying the depth of cut ratio between the main cutters and the scoring cutters.

In one prior art coal planer arrangement, an adjusting screw is arranged between the scoring cutters and the planer carriage, so that the scoring cutters can be raised or lowered by turning the screw. However, in this particular prior art apparatus, two adjusting screws are required, and furthermore, such screws are not capable of performing simultaneously an adjustment in the same direction of the main cutters an the scoring cutters.

According to the invention, this dual problem is solved by placing in the main cutter bearing element a single adjusting device which makes possible adjustments in the same direction of the height of the main and scoring cutters, as well as displacements of the main and scoring cutters in relation to one another. This is accomplished by an adjusting device comprising a screw disposed parallel to the descending guide surface on the carriage, said screw being connected at its lower threaded end by means of a linkage connected to the scoring cutters, and forming together with a threaded sleeve disposed over its shank and its opposite extremity, a removable adjusting unit which passes through a threaded hole in a pivot pin which is pivotally but immovably mounted in the carriage. To establish a selected ratio between the relative movements of the main cutter bearing element and the scoring cutter bearing element to each other and with respect to the carriage when the screw and sleeve members are rotated simultaneously, the screw and sleeve member threads have pitches related to each other in a predetermined ratio, with the pitch of the screw member being preferably one-half that of the pitch of the sleeve member.

The functional unity of the screw and sleeve members can be advantageously set aside temporarily by removing a drift pin that is set in a drift hole passing through the sleeve and the shank of the screw member. With the removal of the drift pin, the screw can then be turned while the sleeve remains motionless, until a selected adjustment ratio is achieved between the scoring cutters and the main cutters. When the drift pin is replaced into the drift hole, the functional unity between the sleeve and screw members is restored and the main cutters move upward or downward together with the scoring cutters in a uniform ratio.

It is therefore an object of the invention to provide a coal planer arrangement having a main cutter bearing element and a scoring cutter bearing element which can be selectively positioned relative to each other and relative to a supporting carriage for advantageous operative engagement with a mine face.

Another object of the invention is to provide a coal planer arrangement as aforesaid wherein the main and scoring cutter bearing elements can be positioned simultaneously by a single adjustment movement.

A further object of the invention is to provide a coal planer arrangement as aforesaid wherein the main and scoring cutter bearing elements can be adjustably positioned either simultaneously, or independently as desired.

Still another and further object of the invention is to provide a coal planer as aforesaid, in which the main and scoring cutter bearing elements can be also pivoted together about a predetermined axis on their supporting carriage.

Other and further objects and advantages of the invention will become apparent from the following detailed description of a preferred embodiment thereof, and from the accompanying drawing in which:

The figure of drawing is a schematic elevation view, partly in section, of a coal planer arrangement according to a preferred embodiment of the invention.

Referring now to the drawing which shows schematically a coal planer arrangement A according to the invention having a carriage means 1 (shown in dash-dotted outline) disposed for movement along a predetermined path, such as that established by the longitudinal guide track T in which said carriage 1 travels, said path ordinarily being situated in front of the mine face F, and running parallel thereto coextensive with the longitudinal extent of said mine face F. For purposes of simplified illustration, and example, it is assumed that the guide track T is supported on the mine floor G and that the mine face F is approximately perpendicular to the floor G.

The carriage 1 is provided with a guide surface 3 which is inclined at an acute angle with respect to the longitudinal travel path of said carriage 1, and hence it is also inclined at an acute angle to the mine face F.

A main cutter bearing element 4 is disposed for movement relative to said carriage 1 along the guide surface 3 thereof which supports said cutter bearing element 4, said movement being along a path parallel to said guide surface 3, which descends toward the coal face F.

A scoring cutter bearing element 14 is pivotally connected by a pin 15 for rotation about a horizontal axis i.e., parallel to the floor G and face F, to permit movement of said cutter bearing element 14 relative to the cutter bearing element 4 in an arcuate swing path about the longitudinal pivot axis of the pin 15.

In accordance with the invention, a means operatively connected to the main cutter bearing element 4 and in operative engagement with the carriage 1 is provided for moving said cutter bearing element 4 relative to said carriage 1 along the guide surface 3 thereof and in a path parallel to said guide surface 3.

While a variety of such means can be used for this purpose, as will be appreciated by the artisan, a preferred means as shown in the drawing including a pin member 2 pivotally connected to the carriage 1 and having a threaded bore 2′ can be used in combination with a rotatable threaded sleeve member 8 which is operatively connected to said main cutter bearing element 4 and is in operative engagement with the threaded bore 2′ of the pin member 2 to move said cutter bearing element 4 in a radial path relative to the pivot axis of said pin, 2, and along the guide surface 3 in response to the rotation of said sleeve member 8. To maintain the aforesaid radial movement path of the cutter bearing element 4 parallel to the guide surface 3, the threaded bore 2′ and the sleeve 8 are disposed for an operative engagement therebetween in which the sleeve 8 rotates about an axis parallel to said guide surface 3, with the cutter bearing element 4 being in sliding contact with said guide surface 3.

A second means operatively connected to the scoring cutter bearing element 14 and to said main cutter bearing element 4 is provided for moving said scoring cutter bearing element 14 relative to said main cutter bearing element 4 along an arcuate swing path about the axis of the pin 15, which is fixed in relation to said main cutter bearing element 4.

Again, a variety of means can be used for performing this function. However, a preferred means including a screw member 5 disposed through the sleeve 8 for rotation about an axis coaxial with the sleeve 8 rotation can be used in combination with a linkage means L operatively connected to the scoring cutter bearing element 14, and in operative engagement with a threaded portion 13 on said screw member 5. The linkage means L includes a crank arm 31 fixedly connected to the cutter bearing element 14, a connecting rod 17, and a follower member 16 having a threaded bore 32 in operative engagement with said threaded portion 13. The connecting rod 17 is pivotally connected to the crank arm 31 by a pin 19 and is also pivotally connected to the follower member 16 by a pin 18. The cutter bearing element 14 can be swung about the pivot axis of the pin 15 by rotating the screw 5, which is mounted to the main cutter bearing element 4 so as to be constrained against axial movement relative thereto, and to cause the following member 16 to travel axially relative to screw 5, and thereby pivotally displace the cutter bearing element 14 by reason of the follower member 16 motion transmitted through the connecting rod 17 and crank arm 31.

While as shown in the drawing, the scoring cutter bearing element 14 and linkage L are arranged for swinging said cutter bearing element 14 in a path lying in a plane perpendicular to that of the guide surface 3, other linkage L and cutter bearing element 14 connection arrangements can be substituted as desired in a given application of the invention.

Briefly considering the detailed features of the coal planer arrangement A of the instant invention, it can be noted that the guide surface 3 of the carriage 1 descends toward the coal face F, and that the pivot pin 2 extends upwardly and outwardly through said surface 3, with the pivot axis of said pin 2 being preferably perpendicular to said guide surface 3.

The entire main cutter bearing element is suspended on the pivot pin 2 which is free to rotate relative to the carriage 1, but is movably mounted thereto. This pivot pin 2 has in its head, which projects above the guide surface 3, a threaded bore 2' into which the threaded portion of the sleeve 8 engages.

The sleeve member 8 forms together with the screw 5 a single adjustment unit which is mounted at 6 and 7 in a hollow portion of the cutter bearing element 4.

The screw 5 has a smooth shank portion 9 over which the threaded sleeve 8 is placed, and said sleeve 8 is provided with an affixed flange 10 and hexagonal portion 11 which provides a flat gripping surface for rotating the sleeve 8 by means of a wrench (not shown).

By providing means operatively connecting the sleeve 8 to the screw 5 for simultaneous rotation therewith, the main and scoring cutter bearing elements 4 and 14 respectively can be moved simultaneously with respect to the carriage 1, and relative to each other by a single adjustment movement wherein the sleeve 8 and screw 5 are rotated together. Such means can be expediently provided in the form of a drift pin 12 disposed through said sleeve 8 and screw 5 to releasably connect said sleeve 8 and screw 5 together for simultaneous rotation. The upper end portion of screw 5 can be provided with a recessed socket (not shown) so as to permit said screw 5 to be rotated independently of the sleeve 8, as when the drift pin 12 is removed. For example, an Allen head wrench can be inserted into the socket for manually turning the screw 5. When the screw 5 and sleeve 8 are connected together by the drift pin 12, they can be turned together simply by a wrench acting upon the hexagonal portion 11.

When the sleeve 8 is rotated, the main cutter bearing element 4 is displaced upward or downward along the guide surface 3, depending upon the direction of rotation of said sleeve 8, and the sense of its threads so that the main cutters 33 indicated in dash-dotted outline and spaced apart from one another can attack the mine face F above or below any rock band that may be present.

Beneath the bearing point 6, the screw 5 has at its bottom free end the threaded portion 13. This threaded portion 13 runs contrary to the thread of the sleeve 8 which encompasses the shank 9 of said screw 5. It is expedient for the threaded portion 13 to have one-half of the pitch of the thread on sleeve 8. This reduction of pitch is necessary to prevent the addition of the movement caused by the contrary thread arrangement and the downward movement of the screw 5. The decreased pitch compensates for one of the two said movements, so that once the displacement ratio between the main cutters 33 and the scoring cutters 14 is set, it will be maintained in the case of any upward or downward movement involving both the main cutter bearing element 4 and scoring cutter bearing element 14.

The scoring cutter bearing element 14 can pivot about the horizontal pivot end 15 which is disposed normally parallel to the floor G and to the coal face F.

The operative connection between the scoring cutter bearing element 14 and the threaded portion 13 on the screw 5 is produced by the follower member 16 which is engaged by the threaded portion 13, and by the connecting rod 17, which is connected by the two pin joints 18 and 19 to the follower member 16 at one end and to the crank arm 31 of the scoring cutter bearing element 14 at the other. The parts 15 to 19 produce a pivoting of the scoring cutter bearing element 14 whenever a relative displacement occurs between the screw 5 and follower member 16. This relative movement however, always takes place when the screw 5 is turned. If the screw 5 is turned together with the sleeve 8, since these two parts are rigidly affixed to one another by the drift pin 12, the scoring cutter bearing element 14 is displaced by the members 15 to 19 to the same extent and in the same direction as the main cutter bearing element 4. If, however, only the screw 5 is turned, but not the sleeve 8, the members 15 to 19 produce a movement of the scoring cutter bearing element 14, while the main cutter bearing element 4 remains unmoved.

A guide pin 20 also indicated in the drawing in dash-dotted lines, is inserted into the carriage 1 through an opening 21 in the main cutter bearing element 4. The pin 20 and opening 21 cooperate in such a manner that the pivoting movement of the main cutter bearing element 4 is limited on both sides. The opening 21 is made of such a size that, regardless of the height adjustment of main cutter bearing element 4, i.e. its radial position relative to the pin 2, the pivoting movement of said cutter bearing element 4 about the pin 2 is always limited to a uniform extent on each side.

Although as previously mentioned herein, the threaded portion 13 preferably has a pitch equal to one-half that of the sleeve 8, other pitch ratios can be provided to establish a selected ratio between the displacement of main end scoring cutter bearing elements 4 and 14 relative to the guide surface 3, and the rotary displacement of said scoring cutter bearing element 14 relative to said main cutter bearing element 4 when the sleeve 8 and screw 5 are rotated together through a given angle.

What is claimed is:

1. A coal planer arrangement which comprises a carriage means disposed for movement along a predetermined path situated in a given relation to a mine face, said carriage means having a guide surface, a first cutter bearing element disposed for movement relative to said carriage means in a first path along the guide surface thereof, a second cutter bearing element pivotally connected to said first cutter bearing element and movable therewith along said first path, said second cutter bearing element being also movable relative to said first cutter bearing element along a second path, a first means operatively connected to said first cutter bearing element and in operative engagement with said carriage means for moving said first cutter bearing element relative thereto along said first path, a second means operatively connected to said first cutter bearing element and to said second cutter bearing element for moving same relative to said first cutter bearing element along said second path, whereby said first and second cutter bearing elements can be selectively positioned relative to each other and relative to said carriage means by said first and second movement means and thereby positioned for operative engagement with the mine face.

2. The coal planer arrangement according to claim 1 including means operatively connecting said first and second movement means to move said first and second cutter bearing elements relative to said carriage means along said first path, and to simultaneously move said second cutter bearing element relative to said first cutter bearing element along said second path.

3. The coal planer arrangement according to claim 1 wherein said first means for moving the first cutter bearing element relative to the carriage means include a pin member pivotally connected to the carriage means, and a sleeve member operatively connected to said first cutter bearing element and in operative engagement with said pin member to move said first cutter bearing element in a radial path relative to the pivot connection axis of said pin member and along the guide surface of said carriage means.

4. The coal planer arrangement according to claim 1 wherein said second means for moving the second cutter bearing element relative to the first cutter bearing element along said second path includes a screw member disposed for rotation about an axis fixed in relation to said first cutter bearing element, said screw member being constrained against axial movement relative to said first cutter bearing element, and linkage means operatively connected to said second cutter bearing element and in operative engagement with said screw member to rotate said second cutter bearing element relative to said first cutter bearing element about the pivot connection axis of said second cutter bearing element in response to the rotation of said screw member.

5. The coal planer arrangement according to claim 1 wherein said first means for moving the first cutter bearing element relative to the carriage means includes a pin member pivotally connected to the carriage means, said pin member having a threaded bore, and a threaded sleeve member disposed for rotation about an axis parallel to the guide surface of said carriage means, said sleeve member being operatively connected to said first cutter bearing element and in operative engagement with the threaded bore of said pin member to move said first cutter bearing element in a radial path relative to the pivot connection axis of said pin member and along the guide surface of the carriage means in response to the rotation of said sleeve member, said radial path being parallel to said guide surface, and wherein said second means for removing the second cutter bearing element relative to the first cutter bearing element includes a screw member disposed through said sleeve member for rotation about an axis coaxial with the axis of rotation of said sleeve member, said screw member being constrained against axial movement relative to said first cutter bearing element, and linkage means operatively connected to said second cutter bearing element and in operative engagement with said screw member to rotate said second cutter bearing element relative to said first cutter bearing element about the pivot connection axis of said second cutter bearing element in response to the rotation of said screw member.

6. The coal planer arrangement according to claim 5 wherein the guide surface of said carriage means is inclined at an acute angle relative to the predetermined path of movement of said carriage means.

7. The coal planer arrangement according to claim 5 including a drift pin disposed through said sleeve member and said screw member to releasably connect said sleeve and screw members together for simultaneous rotation to simultaneously move said first and second cutter bearing elements together relative to the guide surface of the carriage means and to rotate said second cutter bearing element relative to said first cutter bearing element.

8. The coal planer arrangement according to claim 5 wherein the sleeve member and the screw member are threaded oppositely.

9. The coal planer arrangement according to claim 8 wherein the screw and sleeve members have thread pitches related to each other in a predetermined ratio to establish a selected ratio between the displacement of said first and second cutter bearing elements relative to the guide surface of the carriage means, and the rotary displacement of said cutter bearing element relative to said first cutter bearing element when said sleeve and screw members are rotated simultaneously through a given angle.

10. The coal planer arrangement according to claim 9 wherein the screw member has a thread pitch equal to one-half of the thread pitch of the sleeve member.

References Cited by the Examiner

FOREIGN PATENTS 1,288,690 2/1962 France.
859,464 1/1961 Great Britain.

ERNEST R. PURSER, *Primary Examiner.*